Patented June 15, 1954

UNITED STATES PATENT OFFICE 2,681,354

CONDENSATION OF ETHYLENE OXIDE WITH AMINO SUBSTITUTED AMIDES

Maurice J. Kelley, Bloomfield, N. J., and Jacob Levy, Flushing, N. Y., assignors to Nopco Chemical Company, Harrison, N. J., a corporation of New Jersey No Drawing. Application September 2, 1950, Serial No. 183,102

12 Claims. (Cl. 260—404.5)

This invention relates to the condensation of ethylene oxide with amino substituted amides.

In the prior art a number of different compounds have been condensed with oxides such as ethylene oxide. Generally, these reactions have been carried out at relatively high temperatures. Also, such condensations have been effected under high pressure. Economically, it is a distinct disadvantage to carry out reactions under such conditions since the equipment required, of necessity, must be of very strong construction and must often be of rather elaborate design thus causing the equipment to be rather expensive.

It is the object of this invention to provide an improved process for preparing condensation products from ethylene oxide and amino substituted amides.

It is a more particular object of the invention to effect these condensations at relatively low temperatures and at atmospheric pressure.

Other objects of the invention will in part be obvious and will in part appear hereinafter.

The above and other objects of the invention are accomplished by reacting an amide having a replaceable amino hydrogen atom with ethylene oxide at atmospheric pressure in the presence of a catalyst comprising boron trifluoride, the hydrate or etherate thereof.

The amides which can be condensed with ethylene oxide by the process of this invention are aliphatic amides which contain a free primary or secondary amino group. Examples of amides included in this class are mono-amides of ethylene diamine or ethanol ethylene diamine, mono- or di-amides of diethylene triamine, mono-, di- or tri-amides of triethylene tetramine, amino amides prepared from hexaethylene heptamine, etc. Preferably the amino substituted amides are amides prepared by reacting the desired amine with a fatty acid containing from 6 to 30 carbons. Thus, amides such as diethylene triamine monooleamide, ethanol ethylene diamine monooleamide, the amide formed by the condensation of sperm oil and hexaethylene heptamine, ethylene diamine monolauramide and triethylene tetramine dioleamide can be condensed with ethylene oxide in the practice of this invention.

The ratio of ethylene oxide to the amino substituted amide employed in the process of the invention will vary depending upon what properties are desired in the condensation product. In all cases at least about one mole of oxide per mole of amino substituted amide is employed and as much as one hundred or more moles of oxide per mole of amino compound can be employed, if desired. The condensation products obtained are very valuable surface-active compounds. Those condensation products obtained by employing a ratio of from one to twenty moles of oxide per mole of amino substituted amide ordinarily have the most versatile and valuable surface-active properties, but products obtained by employing a ratio of from twenty to one hundred or more moles of oxide per mole of amino compound are also quite valuable and useful products.

In carrying out the process of the invention, the ethylene oxide is reacted with the amino substituted amide in the presence of from 0.1% to 2% of boron trifluoride, its etherate or its hydrate, calculated on the weight of the amide compound. In the preferred embodiment of the invention, the boron trifluoride is employed in the form of its etherate and in quantities of about 0.25% calculated on the weight of the amide compound being used. By carrying out the condensation in accordance with the process of the invention, the condensation can be accomplished at relatively low temperatures as compared to prior art procedures; and as a result the products obtained have a higher degree of purity than the products obtained by the prior art procedures. This is because relatively high reaction temperatures, such as are used in prior art procedures, cause undesirable rearrangements to occur within the molecules of the ethylene oxide condensation products. The condensation products obtained by the process of our invention have properties which are different from and in many cases are substantially superior to the properties of condensation products obtained by prior art methods of condensation which require relatively high reaction temperatures. The rearrangements mentioned above, brought about by the use of such high temperatures, increase the basicity of the condensation products and also render them less soluble and less stable than the products formed by our method. As a result the prior art products have poorer detergency and poorer surface-active properties than the products prepared by the process of the present invention.

The process of the invention may be carried out at any temperature at which the amino substituted amide is in the liquid state. Preferably, however, the temperature of the reaction mixture is not allowed to rise much, if any, above about 100° C. In most cases, the reaction when carried out by the process of our invention will be exothermic and cooling of the reaction mixture will be required to keep the reaction temperature at or below about 100° C.

The ethylene oxide used in the process of our invention can be either in the liquid or gaseous state. We prefer to use ethylene oxide gas but the condensation products obtained by employing the ethylene oxide in liquid form will not differ from those obtained using the gas.

A very outstanding advantage of our process is that it can be carried out at atmospheric pressure, and in the preferred embodiment of our invention, the ethylene oxide is reacted with the amino substituted amide at atmospheric pressure. If desired, however, the reaction may be conducted under a pressure greater than atmospheric pressure.

In carrying out the process of the invention the ethylene oxide and the amino substituted amide are admixed in any desired manner. If the amide is not in the liquid state at room temperature, it is heated to a temperature at which it is a liquid and then it is admixed with the ethylene oxide. Preferably, the ethylene oxide is employed in the gaseous form and is bubbled into the liquid amide until the desired amount of ethylene oxide has been added.

For a fuller understanding of the nature and objects of the invention, reference may be had to the following examples which are given merely as further illustrations of the invention and are not to be construed in a limiting sense.

Example I

A charge of 366 grams (1 mole) of ethanol ethylene diamine monooleamide was reacted with 551 grams (12.5 moles) of ethylene oxide gas in the presence of 0.9 ml. of boron trifluoride etherate. The amide and the ethylene oxide were admixed by bubbling the gaseous oxide into the liquid amide. The temperature during the reaction was maintained at 80–100° C. by cooling of the reaction mixture. The reaction was carried out at atmospheric pressure.

The product formed by this process was an amber liquid having excellent surface-active properties. It gave a clear solution in cold and warm water, in 20% alum solution, 10% salt solution, 6% sodium hydroxide solution, 10% acetic acid solution and in 10% sulfuric acid solution. This condensation product is extremely valuable where it is necessary to employ a surface-active agent in the presence of a relatively high concentration of salt, alkali or acids, a condition which frequently is encountered in such industries as viscose yarn manufacturing, tanning, metal finishing, etc.

Example II

A charge of 730 grams (2.0 moles) of diethylene triamine monooleamide was reacted with 195 grams (4.43 moles) of gaseous ethylene oxide in the presence of 1.9 ml. of boron trifluoride etherate. The ethylene oxide was slowly bubbled into the liquid amide and the temperature adjusted to between 80–100° C. and maintained in this range until all the ethylene oxide had been added and the desired product obtained. The reaction was carried out at atmospheric pressure.

The product of this reaction was an extremely soft, dark amber colored paste. It was found that the acetate salt of this product, when impregnated along with a resinous material on the filter paper of an oil filter, the filter being contained within a circulating lubricating oil system, acts as a detergent on the oil and removes therefrom the dirt, sludge and other foreign material which was peptized from the walls of the system. Moreover, it was found that the organic and inorganic acid salts of this product, for example, acetic acid salts, hydrochloric acid salts, etc., were excellent emulsifiers.

Example III

A charge of 41.0 parts of hexaethylene heptamine was condensed with 59 parts of sperm oil at 170–180° C. for 8 hours. The product was a clear, dark brown liquid. To 33.9 parts of this condensate, an amino amide of hexaethylene heptamine and sperm oil, was added 0.1 part of boron trifluoride etherate and this mixture after thorough agitation was slowly condensed with 66.0 parts of ethylene oxide gas. The reaction was carried out at a temperature of about 80–90° C. and at atmospheric pressure.

The product obtained was a dark amber liquid which gave a clear solution in water, 6% sodium hydroxide solution, 10% salt solution, and in 20% alum solution. This product is highly suitable for use as a spin bath additive in the rayon industry.

Example IV

A charge of 29.2 parts of diethylene triamine monooleamide was reacted with 70.7 parts of gaseous ethylene oxide in the presence of 0.1 part of boron trifluoride etherate. The ethylene oxide was bubbled in very slowly and the temperature adjusted to 80–100° C. and maintained within this temperature until the entire quantity of ethylene oxide had been added. The reaction was carried out at atmospheric pressure.

The product of this condensation reaction was a very dark amber liquid which dissolved in water giving a clear aqueous solution and which gave a clear solution when dissolved in 6% sodium hydroxide solution. This condensate was found to be extremely useful in the rayon industry as a spin bath additive.

By the process of our invention, it is possible to effect the condensation of various amino substituted amide compounds with ethylene oxide at relatively low temperatures and at atmospheric pressure. The advantage of such a discovery is twofold. First, when the condensation of an amino amide with ethylene oxide is carried out at considerably elevated temperatures and under pressures somewhat above atmospheric pressure, rearrangements of the molecule of the condensation product often occur to form an ester type compound. This is apparent from the presence of titratable amino groups in the condensation product. Such rearrangements, depending upon the extent to which they occur, produce properties in the condensation product which are somewhat different from and are far less useful than those found in a product devoid of such rearrangements. These rearrangements within the molecule of the condensation product increase the basicity of the product and decrease the stability and solubility of the product. Our process prohibits to a large extent such rearrangements within the molecules of the condensation products. A second very important advantage of our invention is that in using our novel procedure, the inconvenience and hazards which are present when carrying out reactions at high pressures are avoided. The reasons why our process gives such highly outstanding results are not known. However, the outstanding results set forth above are obtained, i. e. the reaction can be carried out at atmospheric pressure and it can be carried out at temperatures somewhat lower than are required in most prior procedures. Also the condensation products obtained by our process have properties which are somewhat different than and in many cases substantially superior to the properties of condensation products prepared by the prior art procedures. Whether this difference in properties is due to the lower reaction temperatures employed in our process or to carrying out the process at atmospheric pressure or is due to some other effect of the boron trifluoride catalyst other than its influence on causing the reaction to take place at relatively low temperatures and atmospheric pressure is not known. It is known, however, that our process possesses the above-outlined advantages and is thus much superior to the prior art processes.

Having described our invention, what we claim as new and desire to secure by Letters Patent is:

1. A process for the condensation of ethylene oxide with an amino amide compound having a replaceable amino hydrogen atom, which comprises condensing the ethylene oxide with the amino amide compound at a temperature at which the amino amide compound is in the liquid state and in the presence of a compound selected from the class consisting of boron trifluoride, boron trifluoride etherate and boron trifluoride hydrate, the mol ratio of ethylene oxide to said amino amide compound being at least one to one.

2. A process for the condensation of ethylene oxide with an amino substituted amide, said amide being the reaction product of a fatty acid having a carbon chain length of 6 to 30 carbon atoms and a polyamine, which comprises condensing the ethylene oxide with said amide at a temperature at which said amide is in the liquid state and in the presence of a compound selected from the class consisting of boron trifluoride, boron trifluoride etherate and boron trifluoride hydrate, the mol ratio of ethylene oxide to said amino amide compound being at least one to one.

3. The process of claim 2 wherein the amino substituted amide is an amide of diethylene triamine.

4. The process of claim 3 wherein the amino substituted amide is diethylene triamine monooleamide.

5. The process of claim 2 wherein the amino substituted amide is an amide of ethanol ethylene diamine.

6. The process of claim 5 wherein the amino substituted amide is ethanol ethylene diamine monooleamide.

7. The process of claim 2 wherein the amino substituted amide is an amide of hexaethylene heptamine.

8. The process of claim 7 wherein the amino substituted amide is an amide formed by the condensation of sperm oil and hexaethylene heptamine.

9. The process of claim 2 wherein the amino substituted amide is an amide of ethylene diamine.

10. The process of claim 9 wherein the amino substituted amide is ethylene diamine monolauramide.

11. The process of claim 2 wherein the amino substituted amide is an amide of triethylene tetramide.

12. The process of claim 11 wherein the amino substituted amide is triethylene tetramine dioleamide.

References Cited in the file of this patent

UNITED STATES PATENTS

| Number | Name | Date |
| --- | --- | --- |
| 2,085,706 | Schoeller et al. | June 29, 1937 |
| 2,491,478 | Cook et al. | Dec. 20, 1949 |
| 2,520,381 | Carnes | Aug. 29, 1950 |